(12) United States Patent  (10) Patent No.: US 8,016,436 B2
Sugiyama  (45) Date of Patent: Sep. 13, 2011

(54) VEHICLE DOOR MIRROR

(75) Inventor: Masayuki Sugiyama, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 17 days.

(21) Appl. No.: 12/567,003

(22) Filed: Sep. 25, 2009

(65) Prior Publication Data

US 2010/0157451 A1    Jun. 24, 2010

(30) Foreign Application Priority Data

Dec. 24, 2008  (JP) ................................ 2008-326781
Mar. 31, 2009  (JP) ................................ 2009-085047

(51) Int. Cl.
*B60R 1/06*  (2006.01)
(52) U.S. Cl. ......... 359/841; 359/871; 359/872; 248/479
(58) Field of Classification Search .................. 359/841, 359/872, 877, 871; 248/479
See application file for complete search history.

(56) References Cited

U.S. PATENT DOCUMENTS

| | | | | |
|---|---|---|---|---|
| 4,626,084 A | * | 12/1986 | Kumai | 359/841 |
| 4,789,232 A | * | 12/1988 | Urbanek | 248/549 |
| 4,893,916 A | * | 1/1990 | Sakuma et al. | 359/841 |
| 4,915,485 A | * | 4/1990 | Ogasawara | 359/841 |
| 5,005,797 A | * | 4/1991 | Maekawa et al. | 248/479 |
| 5,088,679 A | * | 2/1992 | Ogasawara | 248/479 |
| 5,949,591 A | * | 9/1999 | Whitehead | 359/841 |
| 6,133,704 A | * | 10/2000 | Yoshida et al. | 318/466 |
| 6,481,858 B2 | * | 11/2002 | Inagaki et al. | 359/841 |
| 6,637,898 B2 | * | 10/2003 | Hattori et al. | 359/841 |
| 6,702,448 B2 | * | 3/2004 | Tanaka | 359/838 |
| 7,044,676 B2 | * | 5/2006 | Schuurmans | 403/92 |
| 7,490,945 B2 | * | 2/2009 | Proctor | 359/841 |
| 2009/0279195 A1 | | 11/2009 | Itoh et al. | |

FOREIGN PATENT DOCUMENTS

| | | | |
|---|---|---|---|
| JP | 8-132965 | | 5/1996 |
| JP | 3508088 | | 1/2004 |
| JP | 2004-42866 | | 2/2004 |
| WO | WO 03033303 | * | 4/2003 |

OTHER PUBLICATIONS

English language Abstract of JP 11-078695, Mar. 23, 1999.
Japan Office action, dated Mar. 1, 2011 along with an english translation thereof.

* cited by examiner

*Primary Examiner* — Ricky Shafer
(74) *Attorney, Agent, or Firm* — Greenblum & Bernstein P.L.C.

(57) ABSTRACT

There is provided a vehicle door mirror capable of restraining whistling sounds produced by an airflow passing through a gap between a mirror base and a mirror housing when the vehicle is running. A vehicle door mirror is formed by rotatably supporting a mirror housing on a mirror base. A concave part is formed in a downward surface of the mirror housing that is rotated relative to the mirror base in a state in which the downward surface faces to an upward surface of the mirror base. Protrusions are formed in the entire region of the concave part. The protrusions project to a position close to the upward surface of the mirror base beyond the position of the outside portion of the concave part of the downward surface. The cross section of a front edge of the concave part is formed so as to be rounded.

12 Claims, 8 Drawing Sheets

VEHICLE DOOR MIRROR

The disclosure of Japanese Patent Application Nos. JP2008-326781 filed on Dec. 24, 2008 and JP2009-85047 filed on Mar. 31, 2009 including the specifications, drawings and abstract is incorporated herein by reference in their entirety.

BACKGROUND OF THE INVENTION

1. Field of the Invention

The present invention relates to a vehicle door mirror and, more particularly, to a vehicle door mirror that is capable of restraining wind noise, especially whistling sounds, produced by an airflow passing through a gap between a mirror base and a mirror housing when the vehicle is running.

2. Description of the Related Art

A vehicle door mirror is generally configured so that a mirror base is mounted to a vehicle door, a rotation shaft is installed in a standing manner on the upward surface of the mirror base, and a mirror housing is rotatably supported on the rotation shaft, and is also configured so that the mirror housing can be displaced selectively to a storage position (not-in-use position) and a restoration position (in-use position) by being turned around the rotation shaft manually or electrically. In the vehicle door mirror having the above-described configuration, since the upward surface of the mirror base faces to the downward surface of the mirror housing which faces to the upward surface of the mirror base via a gap, there arises a problem in that uncomfortable whistling sounds are produced by an airflow passing through the gap when the vehicle is running. The whistling sounds are produced because the airflow passing through the gap is a straight flow.

A conventional art for restraining whistling sounds produced by the airflow passing through the gap between the mirror base and the mirror housing when the vehicle is running is described in Japanese Patent No. 3508088. In the art described in Japanese Patent No. 3508088, a large number of dimples (depressions) are formed in the surface of the mirror housing or the mirror base facing to the gap, whereby the airflow passing through the gap is disturbed by the dimples to become turbulent to restrain the whistling sounds.

According to the art described in Japanese Patent No. 3508088, the whistling sound restraining effect is easily affected by the variations in gap size. Even if the gap increases slightly, the airflow passing through the gap becomes a straight flow, and thereby the whistling sound restraining effect cannot be achieved.

SUMMARY OF THE INVENTION

An object of the present invention is to provide a vehicle door mirror that can restrain whistling sounds, which are produced by an airflow passing through a gap between a mirror base and a mirror housing when the vehicle is running, by means of a structure different from that described in Japanese Patent No. 3508088.

The present invention provides a vehicle door mirror including a mirror base mounted to a vehicle door; a rotation shaft installed in a standing manner on an upward surface of the mirror base; and a mirror housing which is rotatably supported on the rotation shaft and is displaced selectively to a storage position and a restoration position, the mirror housing being rotated relative to the mirror base around the rotation shaft in a state in which the upward surface of the mirror base and a downward surface of the mirror housing facing to the upward surface of the mirror base face to each other via a gap, wherein a concave part is formed in the downward surface of the mirror housing facing to the upward surface of the mirror base, and protrusions are distributedly arranged in the concave part.

According to the present invention, since the protrusions are distributedly arranged on the downward surface of the mirror housing facing to the upward surface of the mirror base, an airflow passing through the gap between the mirror base and the mirror housing when the vehicle is running collides with the protrusions, and turns into a turbulent flow. Due to this turbulent flow, the peak of frequency characteristic that produces whistling sounds is reduced, whereby the whistling sounds are restrained. In particular, according to the present invention, since the concave part is formed in the downward surface of the mirror housing, and the protrusions are arranged in the concave part, the lengths of protrusions can be increased accordingly, so that the turbulent flow can be promoted and the whistling sound restraining effect can be enhanced. Also, since the concave part is formed in the downward surface of the mirror housing, and the protrusions are arranged in the concave part, when the vehicle door mirror is viewed from the outside, the concave part is hidden by the surrounding portion. Therefore, the gap between the mirror base and the mirror housing can be made almost the same as the gap in the conventional vehicle door mirror, and the appearance need not be marred.

In the present invention, the protrusions can project to a position close to the upward surface of the mirror base beyond the position of the outside portion of the concave part of the downward surface of the mirror housing. According to this configuration, the airflow passing through the gap between the mirror base and the mirror housing when the vehicle is running can be caused to collide with the protrusions efficiently. In this case, a length by which the protrusions project from the outside portion of the concave part of the downward surface of the mirror housing can be set so as to be equal to or longer than the distance between the tip end portion of the protrusion and the upward surface of the mirror base. According to this configuration, the protrusions project toward the upward surface beyond the position of the outside portion of the concave part of the downward surface of the mirror housing at a sufficient ratio to the distance between the outside portion of the concave part of the downward surface of the mirror housing and the upward surface of the mirror base, so that the airflow passing through the gap between the mirror base and the mirror housing when the vehicle is running can be caused to collide with the protrusions more efficiently. Therefore, the whistling sound restraining effect is less liable to be affected by the variations in gap size, so that even if the gap increases to some extent, the whistling sound restraining effect can be maintained.

In the present invention, the plurality of protrusions can be arranged in a lattice form. According to this configuration, the airflow passing through the gap when the vehicle is running repeatedly collides with the protrusions arranged in a lattice form, so that the turbulent flow is maintained stably, whereby the whistling sound restraining effect can be achieved. This lattice-form arrangement can be made, for example, a zigzag arrangement as viewed from the front and rear direction of vehicle. According to this configuration, the airflow passing through the gap when the vehicle is running zigzags between the protrusions arranged in a zigzag form (refer to FIG. 4). Therefore, the turbulent flow can be promoted as compared with the case where the protrusions are arranged in a longitudinal and transverse lattice form, so that a great whistling sound restraining effect can be achieved.

In the present invention, the cross section of a front edge of the concave part, which is on the vehicle front side when the mirror housing is at the restoration position, can be formed so as to be rounded. According to this configuration, the fluctuations in air pressure at the edge at the time when the vehicle is running can be made gentle as compared with the case where the cross section of the front edge of the concave part is angular, so that the airflow passing through the gap can be induced to the root side of the protrusion smoothly and can be caused to collide with the protrusions efficiently. Therefore, the whistling sound restraining effect is less liable to be affected by the variations in gap size, so that even if the gap increases to some extent, the whistling sound restraining effect can be maintained.

In the present invention, the concave part can be formed in the downward surface of the mirror housing so as to surround the rotation shaft. According to this configuration, the airflow passing through the gap between the mirror base and the mirror housing when the vehicle is running can be made turbulent in a region around the rotation shaft, whereby a great whistling sound restraining effect can be achieved.

In the present invention, the protrusions can be arranged in the entire region of the concave part. According to this configuration, the turbulent flow can be produced in the entire region of the concave part, so that a great whistling sound restraining effect can be achieved.

DETAILED DESCRIPTION OF THE PREFERRED EMBODIMENT

Figure 2:
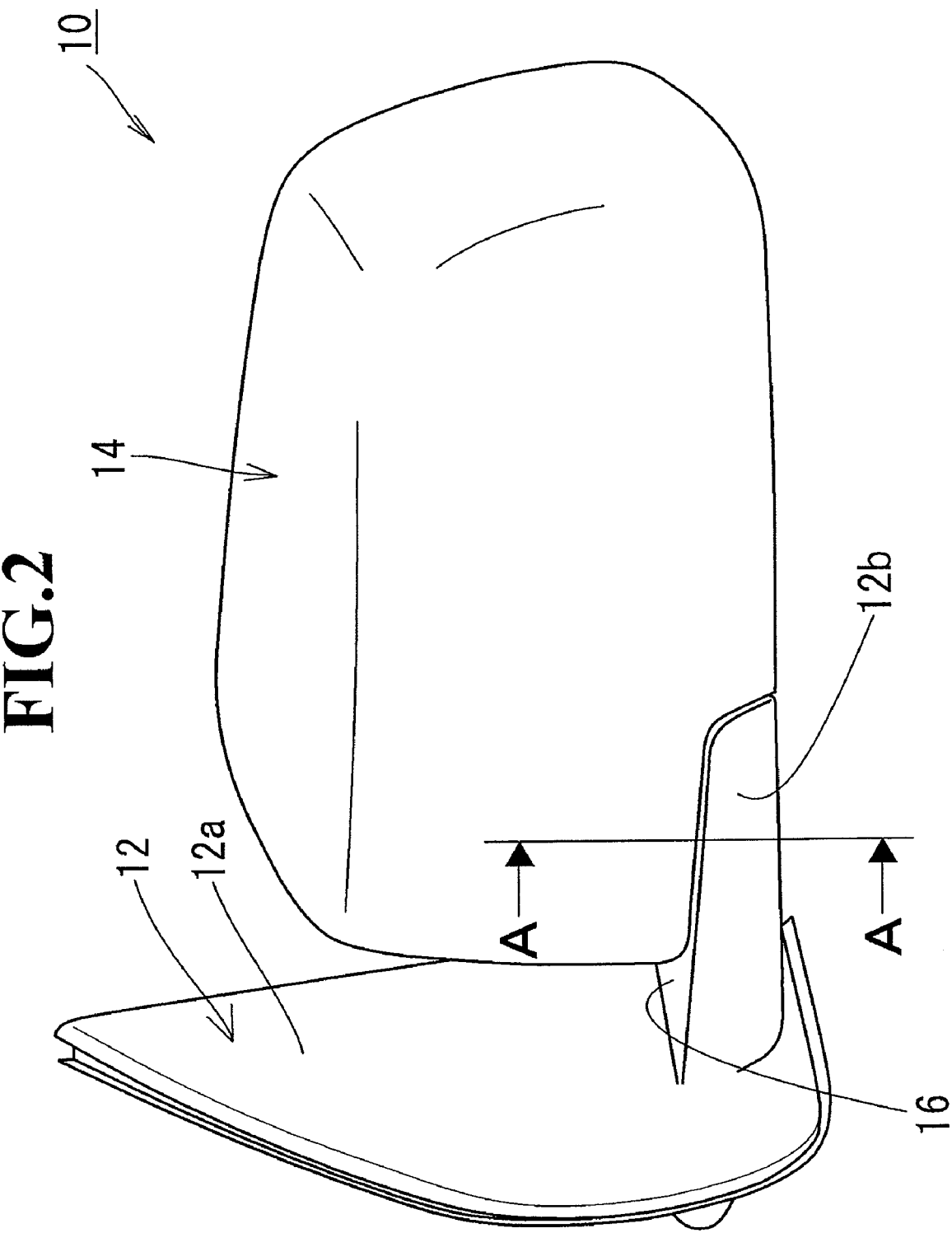
FIG. 2 is a perspective view of a left-side vehicle door mirror in accordance with an embodiment of the present invention in a state in which a mirror housing is at a restoration position, viewed from the vehicle front side.

An embodiment of the present invention will now be described with reference to the accompanying drawings. FIG. 2 shows a state in which a vehicle door mirror (used for the left-hand side) to which the present invention is applied is at a restoration position. This vehicle door mirror 10 includes a mirror base 12 and a mirror housing 14. The mirror base 12 includes a vehicle mounting part 12a mounted to a vehicle door (not shown) and a rotation bed 12b formed so as to project in the transverse direction from a lower portion of the vehicle mounting part 12a. On an upward surface 16 constituting the upper surface of the rotation bed 12b, a rotation shaft 18 (refer to FIG. 5) is erected perpendicularly. To the rotation shaft 18, a frame 30 (refer to FIG. 5) arranged in the mirror housing 14 is connected so as to be rotatable around the axis of the rotation shaft 18 manually or electrically. To the frame 30, an electrical driving mechanism for electrical storage (in the case of an electrical storage type), a mirror main body, and the like (all of them not shown) are mounted. The mirror housing 14 is also mounted to the frame 30. Therefore, the mirror housing 14 is turned, together with the frame 30, around the axis of the rotation shaft 18, and is displaced selectively to a storage position and a restoration position.

Figure 3:
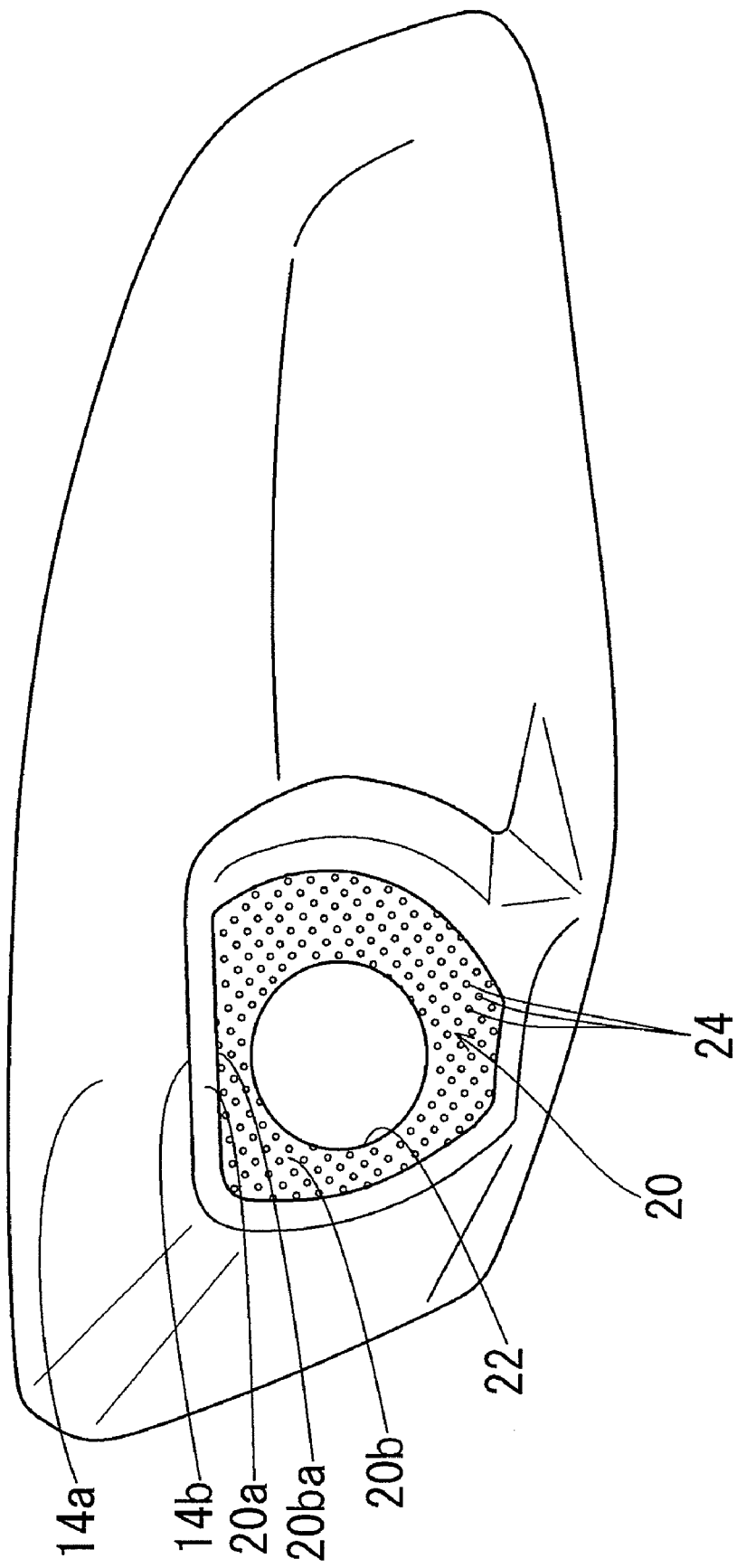
FIG. 3 is a perspective view of a mirror housing of the vehicle door mirror shown in FIG. 2, viewed from the downward surface side.
Figure 4:
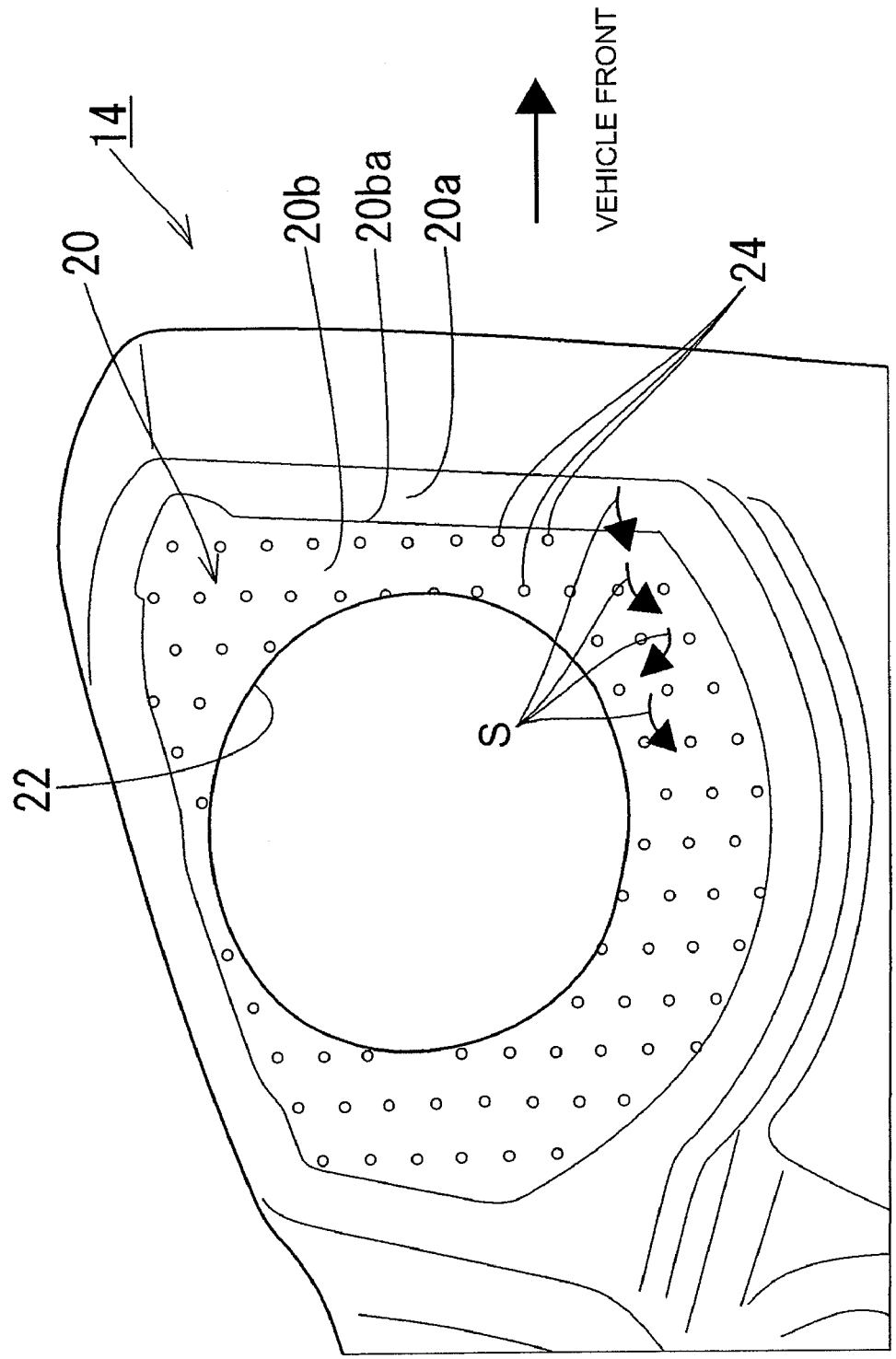
FIG. 4 is an enlarged view of a downward surface of the mirror housing shown in FIG. 3, viewed from the front surface side of the downward surface.

FIG. 3 shows the mirror housing 14 viewed from the downside. On the lower surface of the mirror housing 14, a downward surface 20 is formed so as to rotate relative to the mirror base 12 while facing to the upward surface 16 of the mirror base 12. In the downward surface 20, a concave part 20b having a predetermined depth is formed inside an edge part 20a. The edge part 20a has a predetermined width and is formed throughout the entire periphery of the outer peripheral edge part of the downward surface 20. In the central portion of the concave part 20b, a hole 22 allowing the rotation shaft 18 (refer to FIG. 5) to pass through is provided. In the entire region of the concave part 20b, protrusions 24 are distributedly arranged. FIG. 4 is an enlarged view of the downward surface 20. The protrusions 24 are arranged in a lattice form of zigzag arrangement as viewed from the front and rear direction of vehicle.

The concave part 20b and the protrusions 24 are formed by injection molding integrally with the main body of the mirror housing 14 when the mirror housing 14 is injection molded. Therefore, as compared with the case where an existing mirror housing having no concave part 20b and protrusions 24 is manufactured, irregularities for molding the concave part 20b and the protrusions 24 have only to be added to the mold for injection molding the mirror housing 14, and an additional part need not be prepared as a countermeasure against whistling sounds.

Figure 5:
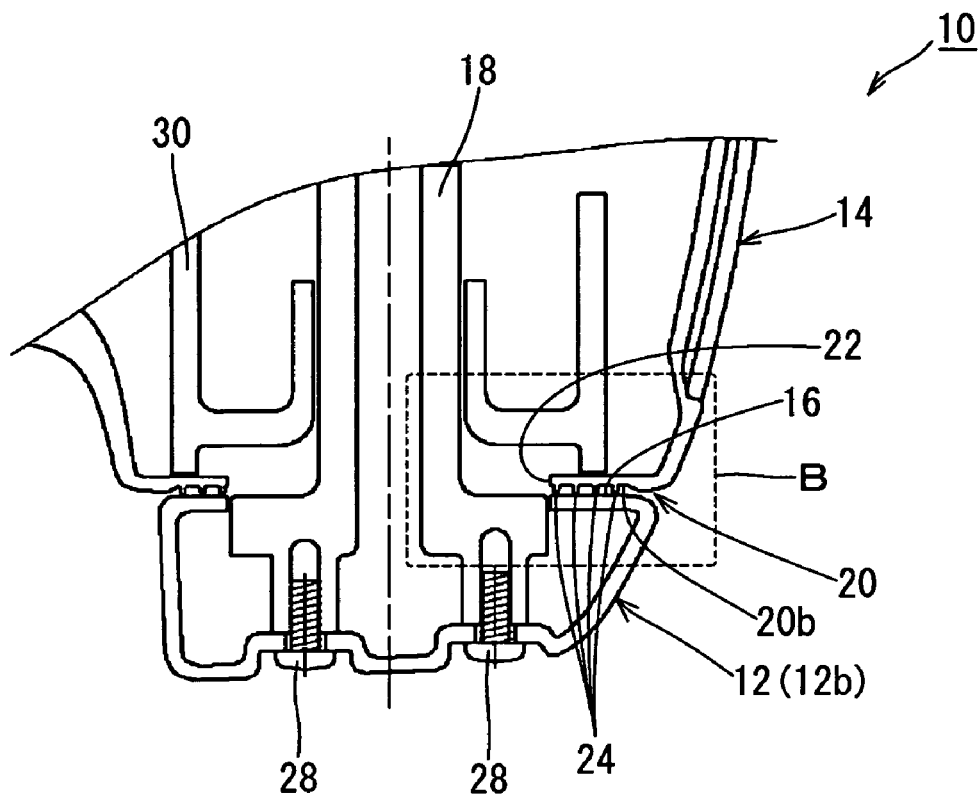
FIG. 5 is a sectional view taken along the line A-A of the vehicle door mirror shown in FIG. 2.

FIG. 5 is a sectional view taken along the line A-A of FIG. 2. The rotation shaft 18 is installed and fixed in a standing manner on the rotation bed 12b of the mirror base 12 with a plurality of screws 28. On the rotation shaft 18, the frame 30 is connectingly supported so as to be rotatable around the axis of the rotation shaft 18. The mirror housing 14 is mounted to the frame 30, and is turned, together with the frame 30, around the axis of the rotation shaft 18, being displaced selectively to the storage position and the restoration position (the position shown in FIG. 2).

Figure 1:
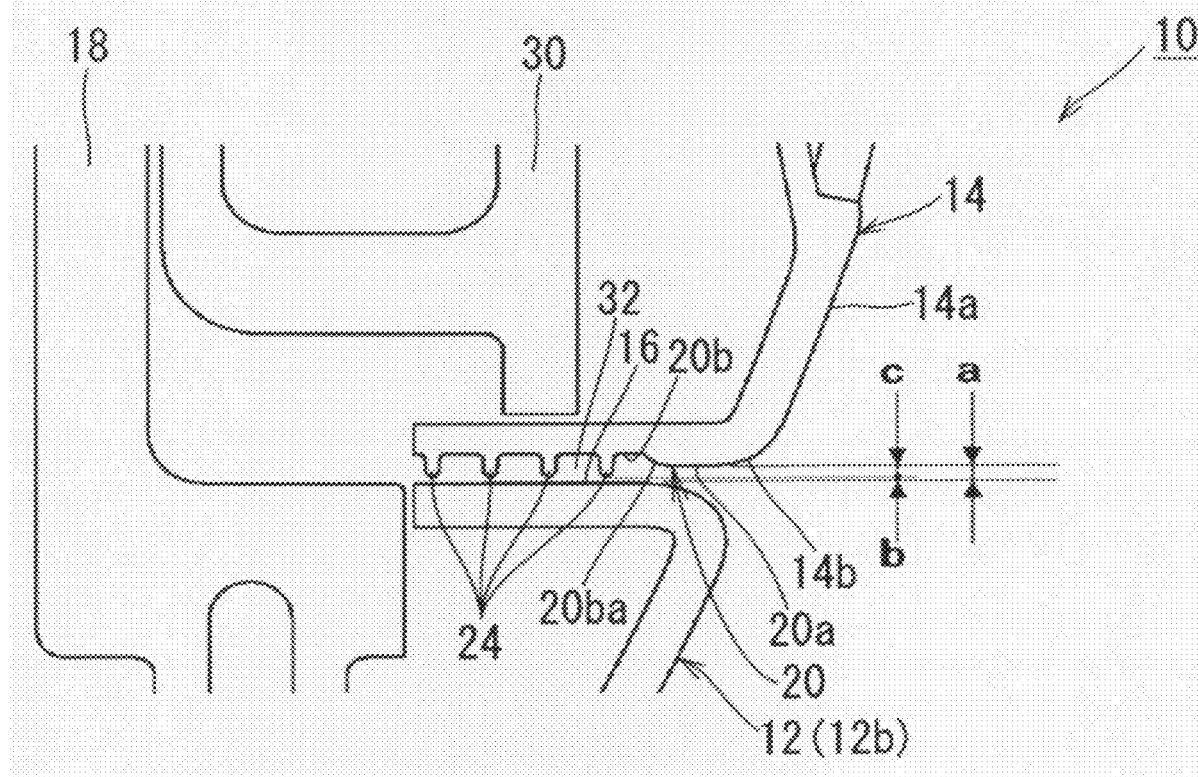
FIG. 1 is an enlarged view of portion B in FIG. 5, showing an embodiment of the present invention.

FIG. 1 is an enlarged view of portion B in FIG. 5. The upward surface 16 of the rotation bed 12b of the mirror base 12 is formed by a smooth plane. The downward surface 20 of the mirror housing 14 is formed by a plane having the concave part 20b and the protrusions 24. The upward surface 16 and the downward surface 20 face to each other via a gap 32. The cross section of an edge 20ba of the outer peripheral edge part of the concave part 20b is formed so as to be rounded throughout the entire periphery. The cross section of an edge 14b of the lower end portion of a surface 14a on the vehicle front side of the mirror housing 14 is also formed so as to be rounded.

In FIG. 1, dimensions a, b and c represent the followings respectively:

Dimension a: a distance between the reference plane (the plane to which the top face of the edge part 20a belongs) of the downward surface 20 of the mirror housing 14 and the upward surface 16 of the mirror base 12

Dimension b: a distance between the tip end portion of the protrusion 24 and the upward surface 16 of the mirror base 12

Dimension c: a distance between the reference plane of the downward surface 20 of the mirror housing 14 and the tip end portion of the protrusion 24 (a length by which the protrusion 24 projects from the reference plane of the downward surface 20 of the mirror housing 14)

The dimensions a, b and c are set so as to bring about a relationship expressed by Formulas (1) and (2) described below.

$$a=b+c \quad (1)$$

$$c \geq b \quad (2)$$

Formula (1) indicates that the protrusions 24 are formed so as to project to a position that is close to the upward surface 16 beyond the reference plane of the downward surface 20 and does not reach the upward surface 16 (a position at which the tip end portions of the protrusions 24 float from the upward surface 16). Formula (2) indicates that the length c by which the protrusions 24 project from the reference plane of the downward surface 20 is set so as to be equal to or longer than the distance b. The dimension a is a dimension that is about the same as the gap between the upward surface of the mirror base and the downward surface of the mirror housing in the conventional vehicle door mirror, and can be set, for example, at about 0.7 mm. The dimension b is an allowance value for preventing the tip end portions of the protrusions 24 from coming into contact with the upward surface 16 of the mirror base 12, and can be set, for example, at about 0.3 mm considering an assembling error, a dimensional change due to wear between parts caused by the repetition of storage operations, and the like. The dimension c becomes 0.4 mm when the dimensions a and b are set at the above-described values. Therefore, the airflow passing through the gap 32 can be caused to collide with the protrusions 24 efficiently. Since the concave part 20b does not mar the appearance of the vehicle door mirror 10, the depth (the depth with respect to the reference plane of the downward surface 20 of the mirror housing 14) of the concave part 20b can be set freely to some extent, and can be set, for example, at about 0.5 to 2.0 mm.

Figure 6:
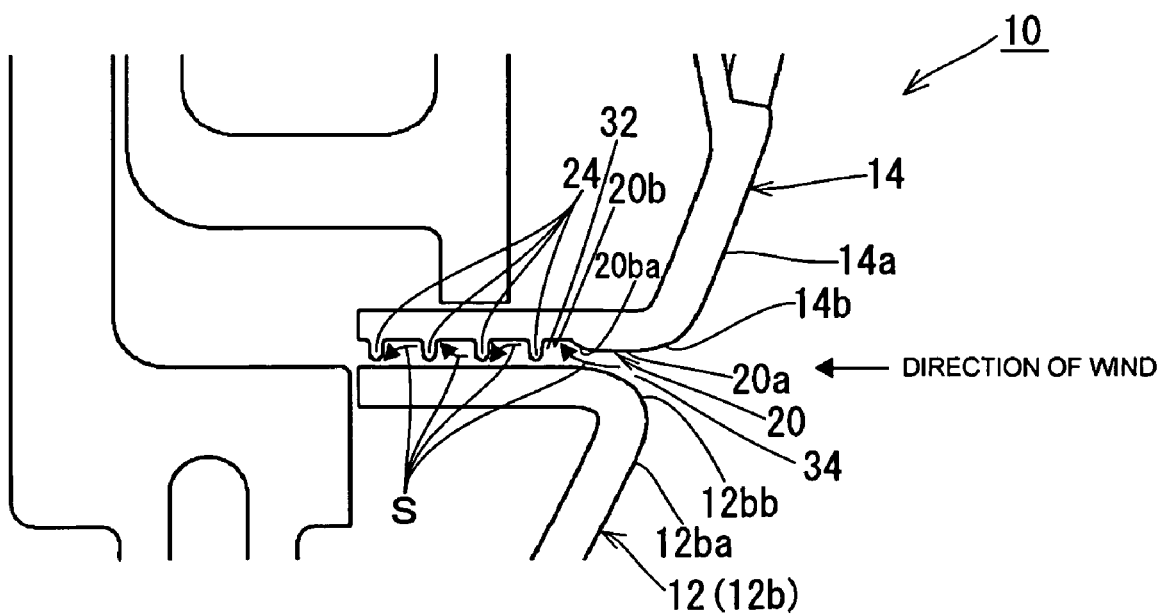
FIG. 6 is a sectional view of the vehicle door mirror shown in FIG. 2 viewed at the same sectional position as that in FIG. 1, showing an airflow at the time when the vehicle is running.

The operation of the vehicle door mirror 10 configured as described above is explained. In FIG. 6 viewed at the same sectional position as that in FIG. 1, the airflow passing through the gap 32 when the vehicle is running is indicated by arrow marks S. The wind created as a result of the running of vehicle hits the surface on the vehicle front side of the vehicle door mirror 10, and flows into a slit 34 that is open between the surface 14a on the vehicle front side of the mirror housing 14 and a surface 12ba on the vehicle front side of the rotation bed 12b of the mirror base 12. At this time, the airflow enters the slit 34 smoothly because the cross sections of both the upper and lower edges 14b and 12bb constituting the slit 34 are formed so as to be rounded. The airflow S flowing into the slit 34 flows into concave part 20b smoothly because the cross section of the edge 20ba on the front edge side of the concave part 20b is formed so as to be rounded, and is induced to the root side of the protrusion 24.

The airflow S induced to the root side of the protrusion 24 repeatedly collides with the plurality of protrusions 24, and turns into a turbulent flow as indicated by the arrow marks S. Especially in this embodiment, since the protrusions 24 are arranged in a lattice form of zigzag arrangement as viewed from the front and rear direction of vehicle, the turbulent flow can be promoted as compared with the case where the protrusions 24 are arranged in a lattice form in the longitudinal and transverse direction as viewed from the front and rear direction of vehicle. In FIG. 4, a plan view of the turbulent flow is shown by the arrow marks S. Due to this turbulent flow S, the flow velocity of airflow passing through the gap 32 between the upward surface 16 and the downward surface 20 decreases, and the peak of frequency characteristic that produces whistling sounds is reduced, whereby the whistling sounds are restrained.

Figure 7:
FIG. 7 is a perspective view of a mirror housing of comparative example having no concave part and protrusions, viewed from the downward surface side.
Figure 8:
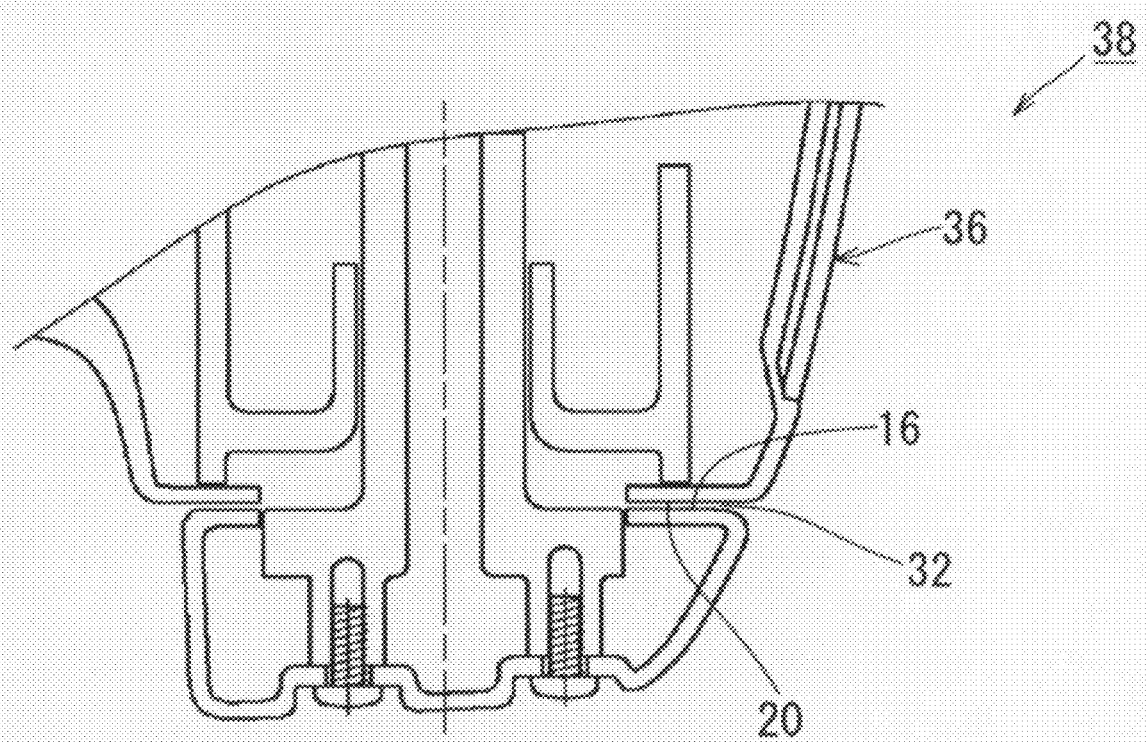
FIG. 8 is a sectional view showing an essential portion of a vehicle door mirror of comparative example having the mirror housing shown in FIG. 7, viewed at the same sectional position as that in FIG. 5.
Figure 9:
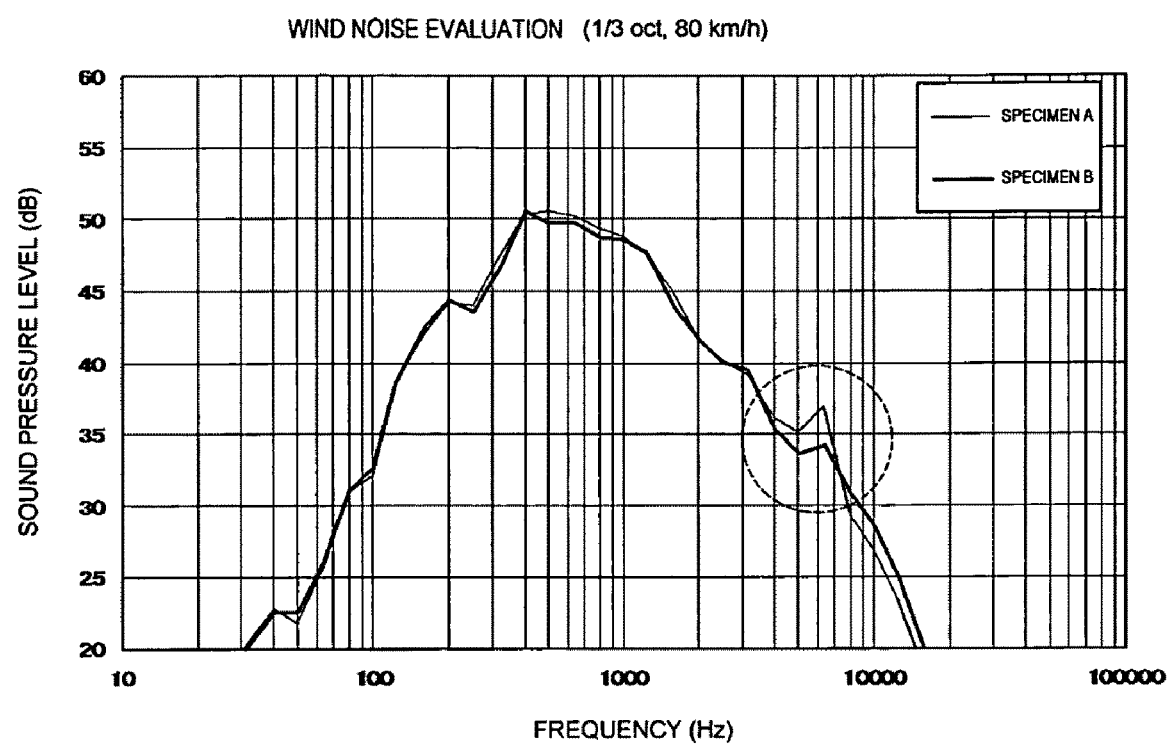
FIG. 9 is a diagram showing measurement results of wind noise for the vehicle door mirror in accordance with an embodiment of the present invention shown in FIG. 2 and the vehicle door mirror of comparative example shown in FIG. 8.

To verify the whistling sound restraining effect of the vehicle door mirror 10 in accordance with the present invention, the wind noise of the vehicle door mirror 10 in accordance with the present invention and the wind noise of a vehicle door mirror of comparative example having no concave part and protrusions were measured. FIG. 7 shows a mirror housing 36 of comparative example having no concave part and protrusions, and FIG. 8 shows an essential portion of a vehicle door mirror 38 of comparative example provided with the mirror housing 36. The vehicle door mirror 38 of comparative example has the same configuration as that of the vehicle door mirror 10 in accordance with the present invention except that the mirror housing 36 of the vehicle door mirror 38 has no concave part and protrusions. In the vehicle door mirror 38, both of the upward surface 16 and the downward surface 20 facing to each other via the gap 32 are formed by a smooth plane. Therefore, the airflow passing through the gap when the vehicle is running becomes a straight flow, so that whistling sounds are liable to be produced. FIG. 9 shows the measurement results of wind noise for both the mirrors. In this measurement, a sound pressure level generated when the vehicle runs at a speed of 80 km/h was measured every frequency component of ⅓ oct. Specimen A indicates the sound pressure level generated by the comparative example, and specimen B indicates the sound pressure level generated by the vehicle door mirror 10 in accordance with the present invention. According to the measurement results, in the comparative example, a peak corresponding to whistling sounds is produced at a frequency of about 5000 to 7000 Hz. In contrast, in the vehicle door mirror 10 in accordance with the present invention, this peak is reduced, and thereby whistling sounds are found to be restrained.

What is claimed is:

1. A vehicle door mirror comprising:
   a mirror base mounted to a vehicle door;
   a rotation shaft installed in a standing manner on an upward surface of the mirror base; and
   a mirror housing which is rotatably supported on the rotation shaft, and is displaced selectively to a storage position and a restoration position,
   the mirror housing being rotated relative to the mirror base around the rotation shaft in a state in which the upward surface of the mirror base and a downward surface of the mirror housing face each other with a gap therebetween, wherein
   a concave part is formed in the downward surface of the mirror housing that faces the upward surface of the mirror base, and protrusions are distributedly arranged in the concave part, wherein the concave part is formed in the downward surface of the mirror housing so as to be recessed away from the upward surface of the mirror base, and
   wherein the protrusions project toward the upward surface of the mirror base and extend beyond a position of an outside portion of the concave part.

2. The vehicle door mirror according to claim 1, wherein a length by which the protrusions project from the outside portion of the concave part of the downward surface of the mirror housing is set so as to be equal to or longer than the distance between the tip end portion of the protrusion and the upward surface of the mirror base.

3. The vehicle door mirror according to claim 2, wherein the plurality of protrusions are arranged in a lattice form.

4. The vehicle door mirror according to claim 2, wherein the cross section of a front edge of the concave part, which is on the vehicle front side when the mirror housing is at the restoration position, is formed so as to be rounded.

5. The vehicle door mirror according to claim 2, wherein the concave part is formed in the downward surface of the mirror housing so as to surround the rotation shaft.

6. The vehicle door mirror according to claim 2, wherein the protrusions are arranged in the entire region of the concave part.

7. The vehicle door mirror according to claim 2, wherein the protrusions are dot-shaped.

8. The vehicle door mirror according to claim 1, wherein the plurality of protrusions are arranged in a lattice form.

9. The vehicle door mirror according to claim 1, wherein the cross section of a front edge of the concave part, which is on the vehicle front side when the mirror housing is at the restoration position, is formed so as to be rounded.

10. The vehicle door mirror according to claim 1, wherein the concave part is formed in the downward surface of the mirror housing so as to surround the rotation shaft.

11. The vehicle door mirror according to claim 1, wherein the protrusions are arranged in the entire region of the concave part.

12. The vehicle door mirror according to claim 1, wherein the protrusions are dot-shaped.

* * * * *